W. M. DUNCAN.
MECHANICAL STOKER.
APPLICATION FILED APR. 4, 1910.
963,532.
Patented July 5, 1910.
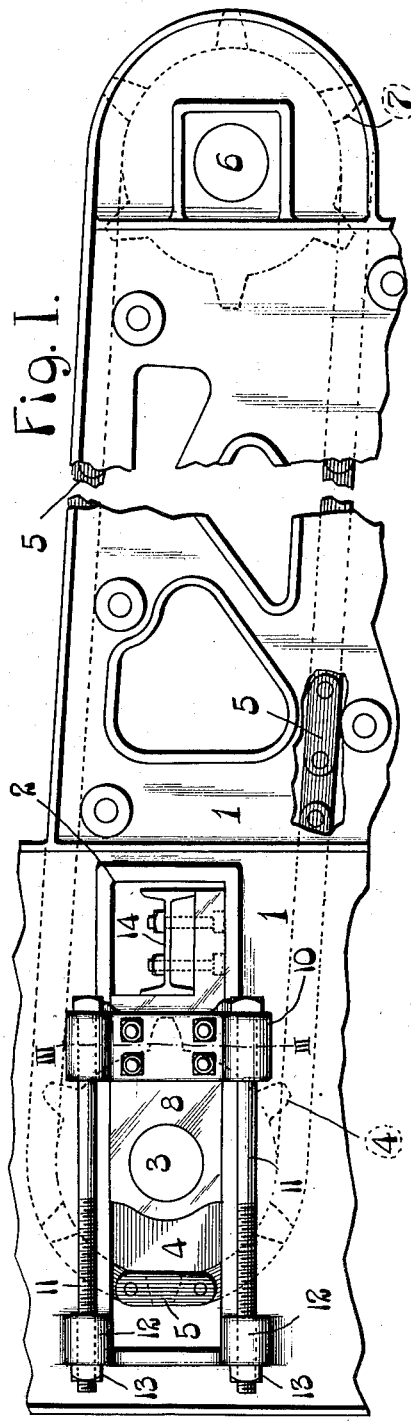
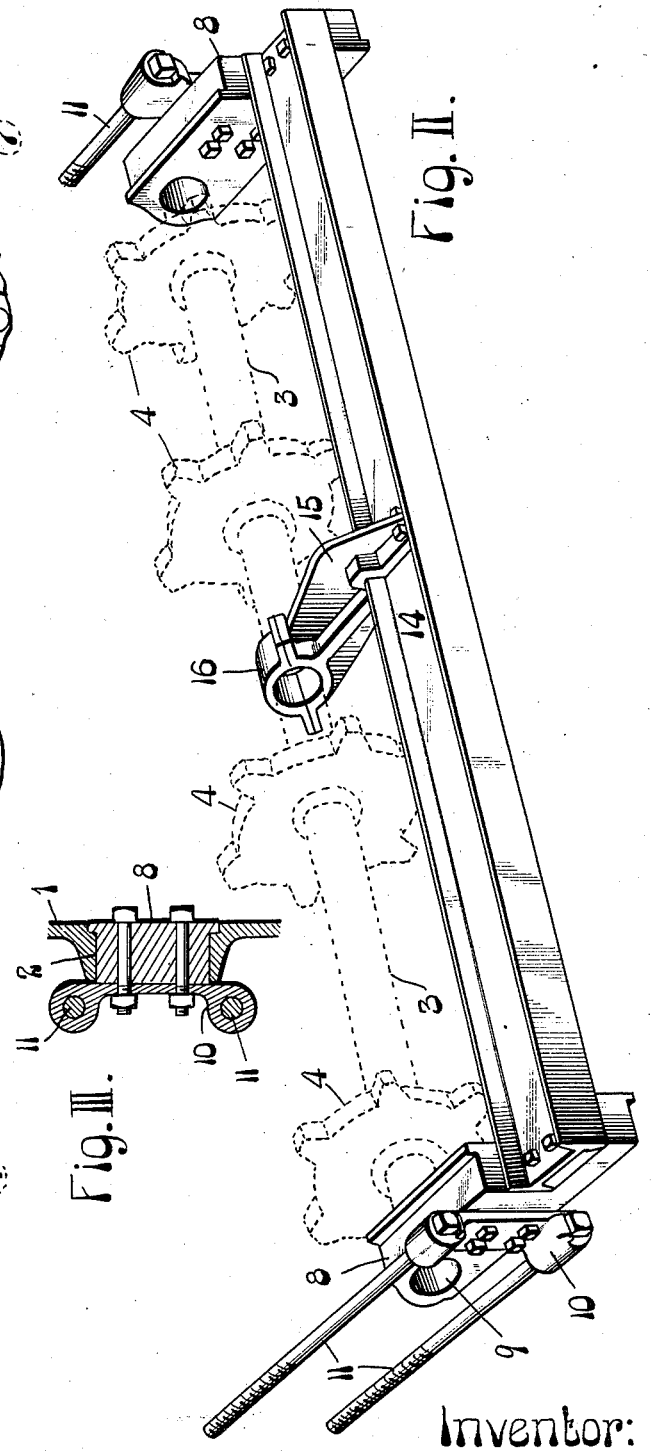
Inventor:
Wm. M. Duncan

UNITED STATES PATENT OFFICE.

WILLIAM M. DUNCAN, OF ALTON, ILLINOIS.

MECHANICAL STOKER.

963,532.

Specification of Letters Patent.   Patented July 5, 1910.

Application filed April 4, 1910.  Serial No. 553,227.

*To all whom it may concern:*

Be it known that I, WILLIAM M. DUNCAN, a citizen of the United States of America, residing in Alton, county of Madison, and State of Illinois, have invented certain new and useful Improvements in Mechanical Stokers, of which the following is a full, clear, and exact description, reference being had to the accompanying drawings, forming part of this specification.

My invention relates to mechanical stokers for use in steam boiler, or other large furnaces.

In mechanical stokers there is commonly employed an endless or chain grate that is operable upon and through the medium of shafts usually supplied with sprocket wheels around which the chain operates, and when such stokers are made of any great width, there is a constant tendency of the shafts mentioned becoming bent or sprung, due to the great degree of strain imposed thereon by the weight of the grate itself and the fuel it serves to support. Said shafts have commonly been supported only in end bearings and, as a consequence, the central portions of the shafts are particularly subjected to strain without any means for resisting the action of the strain upon the shafts.

My invention has for its object to provide a reinforcing member or brace member, whereby an adequate degree of resistance against bending or springing up of the central portions of the shaft is produced, and which is associated with the side members of the stoker that serve to support the shafts.

Figure I is a side elevation of a portion of a mechanical stoker partly broken out, and in which my invention is incorporated. Fig. II is a perspective view of my shaft holding device, with the shaft and sprocket wheels thereon shown in dotted lines. Fig. III is a vertical section taken on the line III—III, Fig. I.

In the accompanying drawings:—1 designates one of the side walls, or supporting frames, of a mechanical stoker, which is provided near one end with a guideway 2 in which a shaft 3 provided with sprocket wheels 4 is movable. The shaft 3 and its sprocket wheels serve as supports at one end of the stoker for the endless grate 5 that is supported at the opposite end of the stoker by a shaft 6 and sprocket wheels 7.

The parts thus far specifically described are usual in mechanical stokers and no invention *per se* is herein claimed for them.

8 designates bearing blocks mounted in the guideways 2 of the side frames 1 and provided with bearing apertures 9 in which the ends of the sprocket wheel shaft 3 are journaled. These bearing blocks are equipped with eye members 10 that receive draw rods 11 which extend through eyes 12 supported by the side frames 1 and are supplied with nuts 13. These parts are designed to serve as supports for the shaft 3 and further as means whereby said shaft may be adjusted longitudinally of the stoker for the purpose of tightening the endless grate 5 and holding it in a taut condition, in order that it may properly support the fuel that is placed thereon in the use of the grate.

14 designates a stay bar arranged parallel with the shaft 3 and secured at its ends to the bearing blocks 8 in such manner as to provide for such bearing blocks and cross bar serving as a rigid carrier or supporting frame for said shaft. The cross bar 14 is preferably, in order that it may have a high degree of resisting power therein, made of I-beam structure.

15 is a bearing arm rigidly secured to the cross bar 14, and provided with a box 16 in which the shaft 3 is seated.

It will be seen that the structure just described provides for the endless grate supporting shaft 3 being efficiently supported intermediate of its ends, in addition to its support at its ends, in consequence of the employment of the cross bar 14 and the bearing box arm 15 and that, therefore, all liability of bending or springing of said shaft by reason of strain thereon is prevented.

It is obvious that while I have only shown one of the bearing box arms 15 applied to the cross bar 14 to serve in connection with the cross bar as a support and resisting means to prevent injury to the shaft 3 under strain imposed thereupon by the endless grate 5, a greater number of such bearing box arms may be utilized upon the cross bar, depending upon necessity for their use, by reason of the length of the shaft necessary for the support of the endless grate according to its width.

While I have shown and described my improvement as used with the grate supporting shaft at only one end of a mechanical stoker, it is obvious that it may be applied at the other end of the stoker with similar efficiency of service.

The shaft resisting means herein described is of particular benefit when used in connection with the bearing blocks 8 adjustably mounted in the side frames of the stoker, for the reason that it not only serves to hold the central portion of the shaft mounted in these bearing blocks from lateral movement intermediate of its ends, but also serves to hold the bearing blocks parallel with each other and reinforce them in such manner as to provide for their being retained in proper alinement with the side frames and the guideways in which they are operable.

I claim:

1. In a mechanical stoker, the combination of side frames, movable carriers in said side frames, a traveling grate, a grate supporting shaft having its ends supported in said carriers, a resistance bar connected to said shaft intermediate of its ends, and at its ends to said carriers, and means for shifting said carriers, shaft and resistance bar jointly.

2. In a mechanical stoker, the combination of side frames, a traveling grate operable between said side frames, bearing blocks movably mounted in said side frames, a grate supporting shaft journaled at its ends in said bearing blocks, a resistance bar carried by said bearing blocks and engaging said shaft intermediate of its ends, whereby the central portion of said shaft is prevented from bending under strain imposed thereupon by said grate, and means for shifting said bearing blocks, shaft and resistance bar jointly.

3. In a mechanical stoker, the combination of side frames, a traveling grate operable between said side frames, bearing blocks slidably mounted in said side frames, a grate supporting shaft journaled at its ends in said bearing blocks, a resistance bar arranged parallel with said shaft and connected at its ends to said bearing blocks, an arm fitted to said resistance bar intermediate of its ends and having a box embracing said shaft intermediate of its ends, whereby the shaft is restrained from bending, and means for shifting said bearing blocks, shaft and resistance bar jointly.

WILLIAM M. DUNCAN.

In the presence of—
A. B. STRATTON,
W. L. JUTTEMEYER.